United States Patent [19]

Kakugo et al.

[11] Patent Number: 4,584,239

[45] Date of Patent: Apr. 22, 1986

[54] STRETCHED MULTILAYER POLYPROPYLENE FILM

[75] Inventors: Masahiro Kakugo; Yoshiharu Fukui; Kizuku Wakatsuki; Seiichiro Ima; Junichi Kimura, all of Chiba, Japan

[73] Assignee: Sumitomo Chemical Company, Limited, Osaka, Japan

[21] Appl. No.: 753,846

[22] Filed: Jul. 11, 1985

[30] Foreign Application Priority Data

Jul. 13, 1984 [JP] Japan ................... 59-146656

[51] Int. Cl.$^4$ ............................................. B32B 27/32
[52] U.S. Cl. ..................................... 428/349; 428/910
[58] Field of Search ................ 428/349, 516, 518, 910

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka et al. | 428/349 |
| 4,294,889 | 10/1981 | Hashimoto | 428/910 |
| 4,339,494 | 7/1982 | Weiner | 428/349 |

FOREIGN PATENT DOCUMENTS 2941140 11/1979 Fed. Rep. of Germany ...... 428/910

*Primary Examiner*—Kittle John E.
*Assistant Examiner*—Patrick J. Ryan
*Attorney, Agent, or Firm*—Sughrue, Mion, Zinn, Macpeak and Seas

[57] ABSTRACT

A stretched multilayer polypropylene film is described, comprising a stretched crystalline polypropylene layer and a layer of a composition (Composition B) laminated on at least one side of said polypropylene layer, wherein the composition B comprises a homo- or copolymer composed mainly of ethylene, propylene or butene-1 and having a melting point of 150° C. or less, and a vinylcycloalkane polymer in an amount of 0.05 wt ppm to 10 wt % calculated as a vinylcycloalkane unit. This multilayer film is greatly improved in optical properties such as excellent see-through properties without deteriorating its good heat sealability. Thus it is very useful for wrapping.

6 Claims, No Drawings

STRETCHED MULTILAYER POLYPROPYLENE FILM

FIELD OF THE INVENTION

The present invention relates to a stretched multilayer polypropylene film having excellent optical properties and also good heat sealability.

BACKGROUND OF THE INVENTION

Stretched polypropylene films are widely used in various fields such as food wrapping and fiber wrapping because of their good optical properties (e.g., transparency and gloss), mechanical properties (e.g., tensile strength and stiffness), and moisture proofness.

Single layer-type stretched polypropylene films, however, are very poor in heat sealability. Therefore, if the films are heat sealed at temperatures at which they are heat sealable, heat shrinkage occurs and they cannot be practically heat sealed.

Various attempts have been made to overcome the above problem, including a method in which only adhesion areas are partly coated on a stretched polypropylene film as a base layer, a method in which an easily heat sealable resin is coated, a method in which another film is laminated on a stretched polypropylene film through an adhesive, and a method in which an easily heat sealable resin is laminated on a stretched polypropylene film by melt extrusion. Japanese Patent Publication No. 11353/66, for example, discloses a method in which an ethylene polymer having good heat sealability, such as an ethylene/vinyl acetate copolymer and a low or intermediate density polyethylene, is laminated in the film form on at least one side of a stretched polypropylene film. It is known, however, that lamination of such an ethylene polymer gives rise to various problems particularly in scratch resistance.

Japanese Patent Publication Nos. 31478/71 and 14343/74 disclose a method of producing a film having good scratch resistance and also relatively good heat sealability, in which a crystalline propylene/ethylene copolymer is laminated. It is also known that of crystalline propylene/ethylene copolymers, a propylene/ethylene random copolymer is relatively good in transparency and has good heat sealability. The heat sealable temperature of the propylene/ethylene random copolymer drops as the ethylene content is increased. In order to increase the heat sealability of the stretched composite film, therefore, it is desirable to increase the ethylene content as much as possible.

As the ethylene content of the propylene/ethylene random copolymer is increased, the scratch resistance of the film is reduced and, furthermore, antiblocking and sliding properties, which are important properties for films, are deteriorated. In general, therefore, an antiblocking agent, such as silica, is added to prevent the deterioration of antiblocking properties. The addition of such antiblocking agents, however, inhibits the optical properties such as transparency and gloss of the film, and hence, it results in deterioration of inherent optical properties of a biaxially stretched polypropylene film. Thus the heat sealability is limited in its improvement.

In order to improve the heat sealability of the propylene/ethylene random copolymer, it may be considered to compound the above-described ethylene/vinyl acetate copolymer or low or intermediate density polyethylene, for example. However, the compatibility of the propylene/ethylene random copolymer with the ethylene copolymer is poor. Thus if the ethylene copolymer is compounded even in a small amount, the transparency of the film is seriously deteriorated.

SUMMARY OF THE INVENTION

As a result of extensive investigations to provide good heat sealability without deteriorating good optical properties such as transparency and gloss which are great features of a stretched polypropylene film, it has been found that a stretched composite polypropylene film having good optical properties such as excellent see-through properties and also good heat sealability can be obtained by laminating a layer of a composition comprising a homo- or copolymer composed mainly of ethylene, propylene or butene-1, said homo- or copolymer having a melting point of 150° C. or less, preferably 150° C. to 40° C., and further containing a vinylcycloalkane polymer (Polymer A) in an amount of 1 wt ppm to 10 wt% calculated as a vinylchcloalkane unit on at least one side of a stretched crystalline polypropylene layer.

Accordingly the present invention relates to a streched multilyaer polypropylene film comprising a stretched crystalline polypropylene layer and a layer of a composition (Composition B) laminated on at least one side of the stretched crystalline polypropylene layer, wherein Composition B comprises a homo- or copolymer composed mainly of ethylene, propylene or butene-1, said homo- or copolymer having a melting point of 150° C. or less, and further contains Polymer A.

DETAILED DESCRIPTION OF THE INVENTION

The content of the vinylcycloalkane polymer (Polymer A) of Composition B is not critical. In order not to change the inherent physical properties of the composition B, however, it is preferred that the amount of the vinylcycloalkane polymer be as small as possible. For this reason, the content of Polymer A is preferably 0.05 wt ppm to 10 wt% and more preferably 1 wt ppm to 1 wt% calculated as a vinylcycloalkane unit.

Typical examples of the vinylcycloalkane include vinylcyclopentane, vinylcyclohexane, and vinylnorbornane. Of these compounds, vinylcycloalkanes having at least 8 carbon atoms are preferred. Particularly preferred is vinylcyclohexane.

Polymer A is a homo- or copolymer composed mainly of said vinylcycloalkane. Examples of Polymer A include a homopolymer of vinylcyclohexane, a copolymer of vinylcyclopentane and a small amount of propylene, and a copolymer of vinylcyclohexane and a small amount of vinylcyclopentane.

Composition B containing the vinylcycloalkane polymer can be prepared by, for example, the following methods.

(1) Using a Ziegler-Natta catalyst, a vinylcycloalkane is first polymerized, and subsequently propylene and ethylene are random copolymerized.

(2) The polymer as obtained in (1) above is mixed with a propylene/ethylene random copolymer.

(3) A vinylcycloalkane polymer and a propylene/ethylene random copolymer are mixed.

The formulation of Composition B comprising the homo- or copolymer composed mainly of ethylene, propylene, or butene-1 and having a melting point of 150° C. or less is determined according to the degrees of heat sealability. Typical examples are a crystalline propylene/ethylene copolymer containing 10 wt% or less of ethylene, a crystalline propylene/butene-1 copolymer containing 50 wt% or less of butene-1, a propylene/ethylene/butene-1 copolymer containing 10 wt% or less of ethylene and 50 wt% or less of butene-1, and their mixtures.

The melting point as referred to herein indicates an absorption peak resulting from the fusion of a sample when the sample is raised in temperature at a constant rate (temperature-raising rate: 4° C./min) by the use of a differential scanning calorimeter (DSC) (i.e., a point at which the amount of heat absorption is maximum).

Composition B may be blended with suitable amounts of known polymers such as an ethylene/propylene (EP) rubber.

In the above methods (2) and (3), the mixing process may be carried out by the usual procedure such as by the use of a roll extruder. To Composition B can be added commonly used various additives such as an antioxidant, a lubricant, an antistatic agent, and an antiblocking agent.

The crystalline polypropylene used in the present invention is a propylene polymer having at least 80 wt% of a boiling n-heptane-insoluble matter, an intrinsic viscosity [$\eta$] of 1.3 to 4.2 dl/g, and containing at least 95 wt% of propylene. A copolymer containing 5 wt% or less of ethylene can be also used as the crystalline polypropylene.

To the crystalline polypropylene can be compounded commonly used various additives such as an antioxidant, a lubricant, an antistatic agent, and an antiblocking agent as in the case of Composition B.

In order to improve the optical properties, if desired, the vinylcycloalkane polymer (Polymer A) can be added to the crystalline polypropylene layer. The crystalline polypropylene layer containing Polymer A can be prepared by the same methods as described for Composition B.

The stretched composite polypropylene film of the present invention can be produced by the following methods.

(1) Crystalline polypropylene as a base material and Composition B are coextruded and laminated and, thereafter, monoaxial stretching and successive or simultaneous biaxial stretching are applied.
(2) Crystalline polypropylene as a base material is extruded in a molten state and monoaxially stretched either in the longitudinal direction or in the vertical direction and, thereafter, Composition B is laminated in a molten state, or in the state of a solidified film and further stretched in a different direction.
(3) Crystalline polypropylene as a base material is extruded in a molten state and monoaxial stretching and successive or simultaneous biaxial stretching are applied and, thereafter, Composition B is extruded in a molten state on the stretched film and laminated.

The degree of stretching in one direction of the crystalline polypropylene layer as a base layer of the stretched composite film of the present invention is 3 to 20 times and preferably 4 to 10 times.

Surface treatment such as corona discharge treatment and flame treatment may be applied onto the stretched composite film of the present invention by techniques commonly employed on an industrial scale.

The stretched multilayer film of the present invention exhibits good optical properties, particularly excellent see-through properties as compared with conventional ones while holding good heat sealability. Thus the stretched composite film is expected to find many applications in the field of wrapping.

The present invention is described in greater detail with reference to the following examples, although it is not limited thereto.

The intrinsic viscosity [$\eta$], melt index, light scattering index (LSI), haze, gloss, heat seal temperature, and melting point were measured by the following methods.
(1) Intrinsic Viscosity [$\eta$]
   Measured at 135° C. in tetralin by the use of an Ubbelohde's viscometer.
(2) Melt index
   Measured according to JIS K6758.
(3) Light Scattering Index (LSI)
   Measured by an LSI tester (receiving scattering transmitting light at 1.2° to 3.6°; manufactured by Toyo Seiki Co., Ltd.). The LSI value was used as a measure of see-through properties because of its good agreement with the see-through properties as examined with the naked eye.
(4) Haze
   Measured according to ASTM D1003.
(5) Gloss
   Measured according to ASTM D2457.
(6) Heat Seal Temperature
   Laminated films were superposed and heat sealed for 2 seconds at a pressure of 2 kg/cm$^2$ G, and a temperature at which a peeling strength (peeling speed: 200 mm/min) in a 25 mm width was 300 g was determined.
(7) Melting Point
   Using DSC Model IB (manufactured by Perkin Elmer Co., Ltd.), a sample was preheated at 220° C. for 5 minutes and, thereafter, manually lowered to 150° C. and then from 150° C. to 40° C. at a constant rate of 4° C./min, and subsequently from 40° C. at a constant rate of 4° C./min. In this way, the melting point was determined.

EXAMPLE 1

In a flask which had been purged with argon gas were successively introduced 650 ml of dehydrated and purified n-heptane, 94 mmol of diethylaluminum chloride, and 27 g of a titanium trichloride catalyst (produced by Marubeni Solvay Co., Ltd.), and the resulting mixture was heated to 60° C. Subsequently, 40 ml of vinylcyclohexane was added and polymerized for 40 minutes. As a result, a catalyst in which 1.02 g of vinylcyclohexane was polymerized per gram of the titanium trichloride catalyst was obtained.

Using 45.7 g of the above vinylcyclohexane polymer-containing catalyst, 180 g of diethylaluminum chloride and 150 l of n-heptane, propylene and ethylene were random copolymerized in a 300-liter stainless steel autoclave under the conditions of ethylene concentration of 2.4 vol%, pressure of 4 kg/cm$^2$ G, temperature of 50° C., and hydrogen concentration of 1.5 vol% for 5 hours. After completion of the polymerization, 30 l of n-butanol was added to stop the polymerization and also to achieve deashing. Then the polymer powder was separated from the solvent by filtration. The dry weight of the polymer powder was 54.7 kg. The amount of the propylene polymerized was 2,350 g per gram of the titanium trichloride catalyst. The intrinsic viscosity [$\eta$] of the polymer was 2.12 dl/g. The vinylcyclohexane content of the copolymer powder was 434 ppm when determined based on the amount of the polymer per the titanium trichloride catalyst. The ethylene content of the copolymer was 4.0 wt%, and the melting point of the copolymer was 144° C.

A mixture of 20 wt% of the above copolymer (a) and 80 wt% of a propylene/ethylene random copolymer (b) having a melt index of 8.0, an ethylene content of 3.9 wt%, and a melting point of 142° C. was prepared. To this mixture were added as stabilizers 0.1 part by weight of calcium stearate and 0.2 part by weight of BHT (2,6-di-tert-butylhydroxytoluene), and 0.05 part by weight of Irganox 1010 ® (antioxidant produced by Ciba Geigy AG; tetrakis[methylene-3(3',5'-di-tert-butyl-4-hydroxyphenyl)propionate]methane), and the resulting mixture was mixed in a Henschel mixer and then pelletized by the use of a 65 mm φ extruder (composition (c)).

A crystalline polypropylene resin (Sumitomo Noblen FS2011D produced by Sumitomo Chemical Co., Ltd.; melt index: 2.6) was melt extruded at a resin temperature of 280° C. by the use of a 65 mm φ sheet extruder and then cooled and solidified with a cooling roll maintained at 20° C. to produce a 0.5 mm-thick sheet.

Composition (c) as prepared above was melt extruded at a resin temperature of 280° C. through an extrusion laminator and laminated in a thickness of 50μ on one side of the above crystalline polypropylene sheet. The laminate thus produced was stretched to 5 times in both the lengthwise and widthwise directions at the same time at a stretching temperature of 150° C. by the use of a small-sized, biaxial stretching apparatus to produce a laminated film having a thickness of about 22μ.

EXAMPLE 2

A laminated film having a thickness of about 21μ was produced in the same manner as in Example 1 except that the copolymer (b) was replaced with a propylene-/ethylene copolymer having a melt index of 67.5, an ethylene content of 3.3 wt%, and a melting point of 145° C.

COMPARATIVE EXAMPLE 1

A laminated film having a thickness of about 22μ was produced in the same manner as in Example 1 except that the copolymer (a)/copolymer (b) mixture was replaced with the copolymer (b) alone.

EXAMPLE 3

A laminated film having a thickness of about 28μ was produced in the same manner as in Example 1 except that the lamination thickness of the composition (c) by the extrusion laminator was changed to 200μ.

COMPARATIVE EXAMPLE 2

A laminated film having a thickness of about 28μ was produced in the same manner as in Example 1 except that the copolymer (a)/copolymer (b) mixture was replaced with the copolymer (b) alone and the lamination thickness of the copolymer (b) on the crystalline polypropylene sheet was changed to 200μ.

EXAMPLE 4

In a flask which had been purged with argon gas were successively introduced 500 ml of dehydrated and purified n-heptane, 75 mmol of diethylaluminum chloride, and 24.9 g of a titanium trichloride catalyst (produced by Marubeni Solvay Co., Ltd.), and the resulting mixture was heated to 60° C. Subsequently, 80 ml of vinylcyclohexane was dropped and polymerized for 150 minutes. As a result, a catalyst in which 4.7 g of vinylcyclohexane was polymerized per gram of the titanium trichloride catalyst was obtained.

Using 22.1 g of the above-prepared vinylcyclohexane polymer-containing catalyst, 180 g of diethylaluminum chloride and 150 l of n-heptane, propylene was polymerized in a 300-liter stainless steel autoclave under the conditions of pressure of 2 kg/cm² G, temperature of 60° C., and hydrogen concentration of 10 vol% for 5 hours. After completion of the polymerization, 30 l of n-butanol was added to stop the polymerization and also to achieve deashing. Then the polymer powder was separated from the solvent by filtration. The dry weight of the polymer powder was 19.2 kg. The amount of the propylene polymerized was 490 g per gram of the titanium trichloride catalyst. The intrinsic viscosity [η] of the copolymer powder was 1.49 dl/g. The vinylcyclohexane content of the copolymer powder was 0.95 wt% as calculated from the amount of the polymer per the titanium trichloride.

Then, 1.0 part by weight of the copolymer (d) as obtained above and the same stabilizers and antioxidant as used in Example 1 were added to a propylene/butene-1 copolymer having a melt index of 4.0, a butene-1 content of 18.3 wt%, and a melting point of 139° C., pelletized in the same manner as in Example 1 (composition (e)), composition (e) was then laminated on the same crystalline polypropylene sheet as used in Example 1 to produce an about 22 μ-thick laminated film.

COMPARATIVE EXAMPLE 3

A laminated film was produced in the same manner as in Example 4 except that only the propylene/butene-b 1 copolymer was laminated on the crystalline polypropylene sheet.

EXAMPLE 5

To a crystalline polypropylene resin having a melt index of 2.0 were added 0.2 part by weight of the copolymer (d) containing 0.95 wt% of vinylcyclohexane as obtained in Example 4 and 0.1 part by weight of calcium stearate and 0.2 part by weight of BHT as stabilizers and 0.05 part by weight of Irganox 1010 ®. The resulting mixture was mixed in a Henschel mixer, pelletized by a 65 mm φ extruder, melt extruded at a resin temperature of 280° C. by the use of a 65 mm φ sheet extruder, and then cooled and solidified with a cooling roll maintained at 20° C. to produce a sheet having a thickness of about 0.5 mm.

Then the composition (e) as obtained in Example 4 was laminated and stretched in the same manner as in Example 1 to produce a laminated film having a thickness of about 22μ, in which both the heat sealability-providing layer and crystalline polypropylene layer contained vinylcyclohexane.

The laminated films as obtained in Examples 1 to 5 and Comparative Examples 1 to 3 were measured for physical properties. The results are shown in Table 1.

It can be seen from Table 1 that the stretched composite films of the present invention (Examples 1 to 4) are greatly improved in optical properties, particularly see-through properties as indicated by the LSI value while maintaining its good heat sealability as compared with the conventional ones.

TABLE 1

| | Physical Properties | | | |
|---|---|---|---|---|
| | Haze (%) | LSI (%) | Gloss (%) | Heat Seal Temperature (°C.) |
| Example 1 | 1.9 | 4.0 | 148 | 130 |
| Example 2 | 2.0 | 3.9 | 143 | 131 |
| Example 3 | 1.8 | 5.2 | 138 | 135 |
| Example 4 | 2.0 | 3.5 | 135 | 102 |
| Example 5 | 1.7 | 3.6 | 137 | 100 |
| Comparative Example 1 | 2.0 | 20.1 | 152 | 129 |
| Comparative Example 2 | 0.7 | 36.4 | 128 | 134 |
| Comparative Example 3 | 1.5 | 17.4 | 132 | 105 |

While the invention has been described in detail and with reference to specific embodiments thereof, it will be apparent to one skilled in the art that various changes and modifications can be made therein without departing from the spirit and scope thereof.

What is claimed is:

1. A stretched multilayer polypropylene film comprising a stretched crystalline polypropylene layer and a layer of a composition (B) laminated on at least one side of the stretched crystalline polypropylene layer, wherein the composition (B) comprises a homo- or copolymer composed mainly of ethylene, propylene or butene-1, said homo- or copolymer having a melting point, as determined with a differential scanning calorimeter, of 150° C. or less, and further contains a vinylcycloalkane polymer (A) in an amount of 0.05 wt ppm to 10 wt% calculated as a vinylalkane unit.

2. A film as claimed in claim 1, wherein the composition (B) comprises a crystalline propylene/ethylene copolymer containing 10 wt% or less of ethylene.

3. A film as claimed in claim 1, wherein the composition (B) comprises a crystalline propylene/butene-1 copolymer containing 50 wt% or less of butene-1.

4. A film as claimed in claim 1, wherein the composition (B) comprises a propylene/ethylene/butene-1 random copolymer containing 10 wt% or less of ethylene and 50 wt% or less of butene-1.

5. A film as claimed in claim 1, wherein the vinylcycloalkane polymer (A) is a polymer of vinylcyclopentane, vinylcyclohexane, or vinylnorbornane.

6. A film as claimed in claim 5, wherein the vinylcycyloalkane polymer (A) is a polymer of vinylcyclohexane.

* * * * *